(12) United States Patent
Fan et al.

(10) Patent No.: US 9,059,610 B2
(45) Date of Patent: Jun. 16, 2015

(54) AXIAL HYBRID MAGNETIC BEARING, METHOD FOR OPERATION THEREOF, AND STRUCTURE FOR ROTOR THEREOF

(75) Inventors: Yi-Hua Fan, Jhongli (TW); Kuan-Yu Chen, Jhongli (TW); Ying-Tsun Lee, Jhongli (TW); Yi-Lin Liao, Jhongli (TW)

(73) Assignee: CHUNG YUAN CHRISTIAN UNIVERSITY, Tao-Yuan (TW)

( * ) Notice: Subject to any disclaimer, the term of this patent is extended or adjusted under 35 U.S.C. 154(b) by 818 days.

(21) Appl. No.: 13/082,555

(22) Filed: Apr. 8, 2011

(65) Prior Publication Data

US 2012/0169167 A1 Jul. 5, 2012

(30) Foreign Application Priority Data

Dec. 30, 2010 (TW) .............................. 99146900 A

(51) Int. Cl.
*H02K 7/09* (2006.01)
*F16C 32/04* (2006.01)

(52) U.S. Cl.
CPC .............. *H02K 7/09* (2013.01); *F16C 32/0444* (2013.01); *F16C 32/0478* (2013.01)

(58) Field of Classification Search
CPC ..... H02K 7/09; F16C 39/063; F16C 32/0476; F16C 32/0465; F16C 32/0468; F16C 32/044
USPC .......................................... 310/90.5
See application file for complete search history.

(56) References Cited

U.S. PATENT DOCUMENTS

| | | | | |
|---|---|---|---|---|
| 5,126,610 A | * | 6/1992 | Fremerey | 310/90.5 |
| 5,892,307 A | * | 4/1999 | Pavlovich et al. | 310/68 B |
| 6,264,635 B1 | * | 7/2001 | Wampler et al. | 604/151 |
| 2003/0201684 A1 | * | 10/2003 | Browning et al. | 310/90.5 |
| 2004/0022653 A1 | * | 2/2004 | Brunet et al. | 417/423.5 |
| 2009/0126519 A1 | * | 5/2009 | Chassoulier | 74/5.46 |

* cited by examiner

*Primary Examiner* — Terrance Kenerly
(74) *Attorney, Agent, or Firm* — WPAT, PC; Justin King

(57) ABSTRACT

An axial hybrid magnetic bearing (HMB) is disclosed herein. The HMB has a first electric magnet, a second electric magnet, and a rotor being between the two electric magnets. The rotor has a permanent magnet (PM) structure facing the two electric magnets by its two sides. By doing so, the power consumption can be lower by a bias magnetic flux provided by the PM structure; the equilibrium point of the rotor can be adjusted by the magnetic force of the two electric magnets, which will not change the magnetic characteristic of the PM structure.

20 Claims, 8 Drawing Sheets

AXIAL HYBRID MAGNETIC BEARING, METHOD FOR OPERATION THEREOF, AND STRUCTURE FOR ROTOR THEREOF

BACKGROUND OF THE INVENTION

1. Field of the Invention

This invention generally relates to the field of non-contact bearings, and more particularly, to an axial hybrid magnetic bearing, method for operation thereof, and structure for rotor thereof.

2. Description of the Prior Art

The active magnetic bearings (AMB) are non-contact bearings and they are increasingly being used in industrial applications, for example, the spindle of machine tool, energy storage flywheels and turbo-molecular pumps, etc. In the vertical rotary mechanism, the axial bearing suffered the most loading to suspend the rotor. In these applications, the electric-magnet-biased axial magnetic bearings will consume a lot of electric power.

In order to reduce the electric power, there are many researches about the hybrid magnetic bearings (HMB) to lower the power consumption, such as Sortore C. K., Allaire P. E., Maslen E. H., Humphris R. R. and Studer P. A., "Permanent magnet biased magnetic bearings-design, construction and testing," Proceedings of 2nd international symposium on magnetic bearings Tokyo Japan, pp. 12-4, 1990, Satoru FUKATA, Kazuyuki YUTANI and Yoshinori KOUYA, "Characteristics of Magnetic Bearing Biased with Permanent Magnets in the Stator," JSME Int. J., Ser. C, Vol. 41, No. 2, pp. 2006, 1998, and Xu Yanliang, Dun Yueqin, Wan Xiuhe and Kong Yu, "Analysis of Hybrid Magnetic Bearing With a Permanent Magnet in the Rotor by FEM," IEEE Transaction on Magnetics, Vol. 42, No. 4, pp. 1363, 2006. From the data in these researches, we know that the hybrid magnetic bearings are useful than traditional active magnetic bearings.

And there are many researches which concerning the permanent magnet to be a novel design, for example, Han W. S., Lee C. W. and Okada Y., "Design and control of a disk-type integrated motor-bearing system," IEEE/ASME Tran. Mechatron., Vol. 7(1), pp. 15-22, 2002, Okada Y., Konish H., Kanebako H. and Lee C. W., "Lorentz force type self-bearing motor," Proceedings of 7th international symposium on magnetic bearings, pp. 353-358, 2000, and Maslen E. H., Allaire P. E., Noh M. D. and Sortore C. K., "Magnetic bearing design for reduced power consumption," ASME J. Trib., Vol. 118, pp. 839-846, 1996. But the designs of these HMB are not consider of the magnetic flux coupling, so the electric magnetic flux will pass through the permanent magnets. That is, the permanent magnets are magnetizing and de-magnetizing as the electric magnets work. The operation situation will demand the performance of the permanent magnets.

In view of the drawbacks mentioned with the prior art of HMB, there is a continuous need to develop a new and improved HMB that overcomes the shortages associated with the prior art of HMB. The advantages of the present invention are that it solves the problems mentioned above.

SUMMARY OF THE INVENTION

In accordance with the present invention, an axial hybrid magnetic bearing, method for operation thereof, and structure for rotor thereof substantially obviate one or more of the problems resulted from the limitations and disadvantages of the prior art mentioned in the background.

One of the purposes of the present invention is to provide a bias magnetic flux from a permanent magnet structure to lower the electric consumption of an axial hybrid magnetic bearing.

Another one of the purposes of the present invention is to use the magnetic flux generated by two electric magnets to adjust the equilibrium point of a rotor, and to couple with the magnetic flux of a permanent magnet structure, whereby the magnetic characteristic of the permanent magnet structure will not be changed.

The present invention provides an axial hybrid magnetic bearing. The axial hybrid magnetic bearing includes a first electric magnet, a second electric magnet, and a rotor. The rotor is between the first electric magnet and the second electric magnet, wherein the rotor has a permanent magnet structure facing the first and the second electric magnets by its two sides.

The present invention further discloses a rotor used in an axial hybrid magnetic bearing to provide a bias magnetic flux to the axial hybrid magnetic bearing to lower the electric consumption. The rotor includes a main part and a permanent magnet structure. The permanent magnet structure is set in the main part and faces a first electric magnet and a second electric magnet by its two sides.

The present invention still reveals a method for operating an axial hybrid magnetic bearing. The method includes using a bias magnetic flux of a permanent magnet structure to suspend a rotor, wherein the permanent magnet structure is set in the rotor and faces a first electric magnet and a second electric magnet by its two sides; and using the magnetic flux of the first electric magnet and the second electric magnet to adjust an equilibrium point of the rotor.

BRIEF DESCRIPTION OF THE DRAWINGS

The accompanying drawings incorporated in and forming a part of the specification illustrate several aspects of the present invention, and together with the description serve to explain the principles of the disclosure. In the drawings.

DETAILED DESCRIPTION OF THE PREFERRED EMBODIMENTS

Some embodiments of the present invention will now be described in greater detail. Nevertheless, it should be noted that the present invention can be practiced in a wide range of other embodiments besides those explicitly described, and the scope of the present invention is expressly not limited except as specified in the accompanying claims.

Moreover, some irrelevant details are not drawn in order to make the illustrations concise and to provide a clear description for easily understanding the present invention.

Figure 1A:
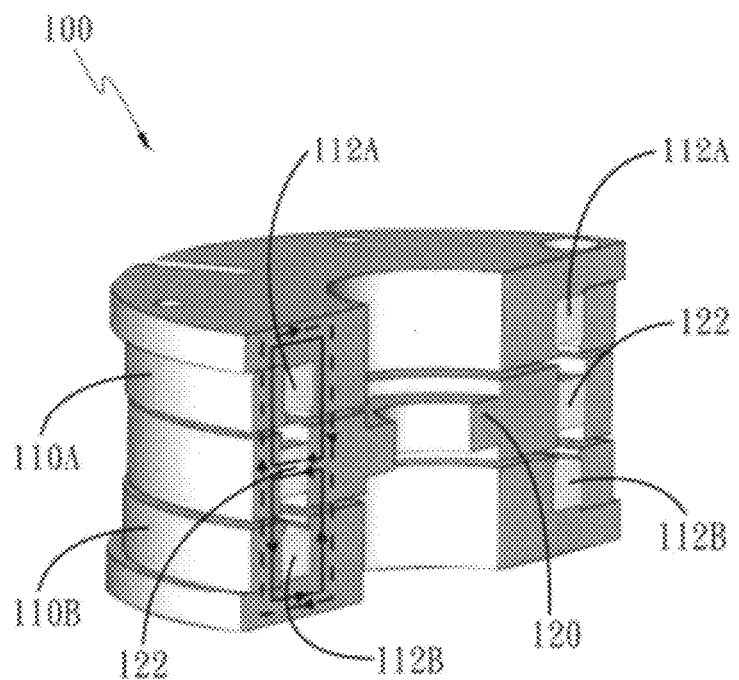
FIG. 1A illustrates a 3D cross-sectional view for one preferred embodiment in accordance with the present invention.

Referring to FIG. 1A, a 3D cross-sectional view for one preferred embodiment 100 in accordance with the present invention is illustrated. A rotor 120 is between a first fixing part 110A and a second fixing part 110B. The first and the second fixing parts 110A and 110B have a first electric magnet 112A and a second electric magnet 112B, respectively. The rotor 120 includes a magnet structure 122, such as permanent magnet. The magnet structure 122 faces the first and the second electric magnets 112A and 112B by its two sides. In the present embodiment, the first and the second fixing parts 110A and 110B are respectively a first and a second disk-shaped stators (or stator disks) and face to each other. The first and the second electric magnets 112A and 112B are respectively set in the inside surfaces of the first and the second fixing parts 110A and 110B, wherein the first electric magnet 112A is a first ring coil and the second electric magnet 112B is a second ring coil. In the present embodiment, the permanent magnet structure 122 is also a ring structure for correspondingly facing the first and the second electric magnets 112A and 112B by its two sides. By doing so, the magnetic flux generated by the permanent magnet structure 122 is used to be a bias magnetic flux to suspend the rotor 120 in order to lower the electric consumption. Also, coupling the magnetic flux generated by the first and the second electric magnets 112A and 112B and the permanent magnet structure 122 is used to prevent form changing the characteristic of the permanent magnet structure 122. Please refer to FIG. 1A again. The magnetic circuits generated by the permanent magnet structure 122 are depicted in solid lines, the magnetic circuits generated by the first and the second electric magnets 112A and 112B are depicted in dashed lines, and this part will be described later.

Figure 1B:
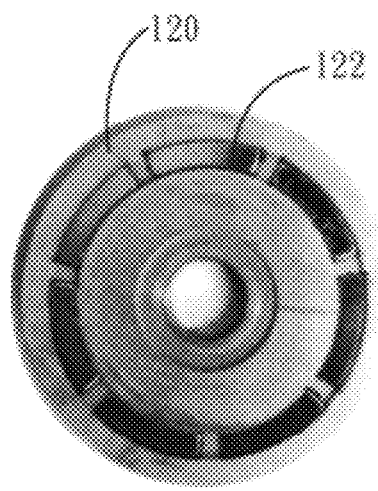
FIG. 1B illustrates one preferred rotor embodiment in accordance with the present invention.

Referring to FIG. 1B, one preferred rotor embodiment 120 for the preferred embodiment 100 shown in FIG. 1A in accordance with the present invention is illustrated. The rotor 120 includes a main part (that is, the rotor 120 itself) and a permanent magnet structure 122. The rotor 120 is used in an axial hybrid magnetic bearing to provide a bias magnetic flux to the axial hybrid magnetic bearing to lower the electric consumption. In the present embodiment, the permanent magnet structure 122 is embedded in the rotor 120 and faces a first electric magnet 112A and a second electric magnet 112B (referring to FIG. 1A) by its two sides. Wherein, the rotor 120 includes a disk-shaped rotor (or so-called rotor disk), the permanent magnet structure 122 includes a plurality of arc-shaped permanent magnets set in the rotor and arranged as a ring. In the present embodiment, the plurality of arc-shaped permanent magnets include 7 arc-shaped permanent magnets, but not limited to. The numbers of the arc-shaped permanent magnets could be adjusted to meet the practical needs.

Figure 2:
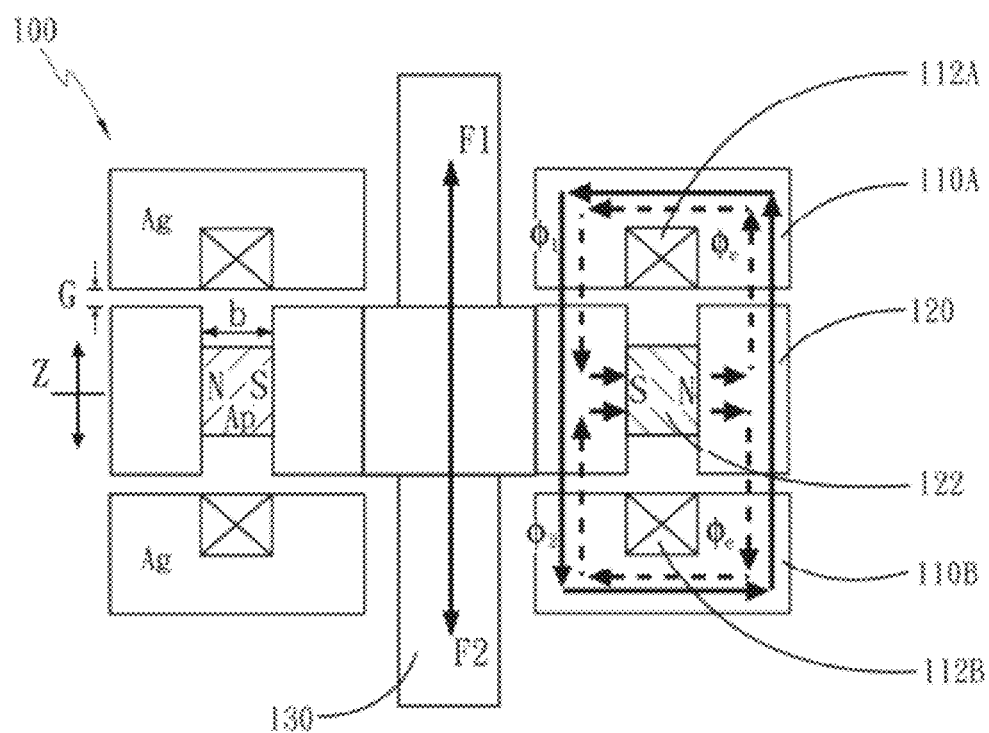
FIG. 2 illustrates the analysis of the magnetic circuits for the embodiment shown in FIG. 1A.

Referring to FIG. 2, an analysis of the magnetic circuits for the preferred embodiment 100 shown in FIG. 1A is illustrated. The present embodiment uses the magnetic force of a permanent magnet structure 122 to provide a bias magnetic flux to suspend a rotor 120 in order to decrease the power consumption. Wherein, the permanent magnet structure 122 is embedded in the rotor 120 and faces a first electric magnet 112A and a second electric magnet 112B by its two sides respectively. In the present embodiment, the permanent magnet structure 122 includes 7 arc-shaped permanent magnets arranged in concentric with the rotor 122. However, the numbers of the arc-shaped permanent magnets can be adjusted depend on the practical needs. In the present embodiment, the rotor 120 could be a disk-shaped rotor (or so-called rotor disk). The present embodiment also utilizes the magnetic flux generated by the first and the second electric magnets 112A and 112B to adjust the equilibrium point of the rotor 120, and to couple with the magnetic flux of the permanent magnet structure 122 to prevent from changing the magnetic characteristic of the permanent magnet structure 122. In the present embodiment, the first and the second electric magnets 112A and 112B are a first ring coil and a second ring coil set in a first fixing part 110A and a second fixing part 110B, respectively. Wherein, the first and the second electric magnets 112A and 112B are controlled by a proportional and derivative (PD) controller.

Please refer to FIG. 2 again. The magnetic flux provided by the permanent magnet structure 122 passes through the rotor 120 from inside to outside, taking two paths axially along the working air-gaps and passing through the working air-gaps between the rotor 120 and the first and the second fixing parts 110A and 110B, passing through the first and the second fixing parts 110A and 110B from outside to inside, passing through the working air-gaps between the first and the second fixing parts 110A and 110B and the rotor 120, and then returns to the permanent magnet structure 122. The above-mentioned magnetic circuits are depicted in dashed lines shown in FIG. 2. The magnetic flux provided by the first and the second electric magnets 112A and 112B passes through the first fixing part 110A from outside to inside, axially along the working air-gaps and passing through the working air-gaps between the first fixing part 110A and the rotor 120, passing the rotor 120, passing through the working air-gap between the rotor 120 and the second fixing part 110B, passing through the second fixing part 110B from inside to outside, axially along the working air-gaps and passing through the working air-gaps between the second fixing part 110B and the rotor 120, passing the rotor 120, passing through the working air-gap between the rotor 120 and the first fixing part 110A, and then returns to the first fixing part 110A. The magnetic circuits mentioned above are depicted in solid lines shown in FIG. 2. However, the magnetic circuits described above are only used to explain the present embodiment, not limit to the present invention.

The magnetic fluxes caused by the permanent magnet structure 122 in the air-gaps are:

$$\phi_1 = \frac{\mu_0 \; A_g A_p \; bB_o}{2(G-z)\mu A_p + b\mu_0 A_g}$$

$$\phi_2 = \frac{\mu_0 \; A_g A_p \; bB_o}{2(G+z)\mu A_p + b\mu_0 A_g}$$

Where $\mu_0$ is the permeability of the free space, $A_g$ is the cross-sectional area of the stator (first fixing part 110A, second fixing part 110B), $A_p$, is the cross-sectional area of the permanent magnet structure 122, b is the length of the permanent magnet, $\mu$ is the slope of demagnetization curve of the permanent magnet structure 122 at the working point, $B_0$ is the residual magnetic flux density for the rare-earth permanent magnet structure, G is the uniform air-gap and Z is the displacement of the rotor 120 from the equilibrium point.

The loop equation of the electric magnetic circuit can be expressed as:

$$-R_2\phi_e + Ni_z + Ni_z - R_1\phi_e = 0$$

Where $$R_1 = \frac{x*2G}{\mu_0 A_g},$$

-continued $$R_2 = \frac{(1-x)2G}{\mu_0 A_g},$$

then we got:

$$\phi_e = \frac{2Ni_z}{R_1 + R_2} = \frac{\mu_0 A_g Ni_z}{G}$$

The total flux in the air-gaps are:

$$\phi_{t1} = \phi_1 + \phi_e$$

$$\phi_{t2} = \phi_2 + \phi_e$$

So, the magnetic force to the rotor 120 is:

$$F_z = F_1 - F_2 = \frac{\phi_{t1}^2}{2\mu_0 A_g} - \frac{\phi_{t2}^2}{2\mu_0 A_g}$$

According to the equation of the magnetic force mentioned above, the magnetic force to the axial hybrid magnetic bearing is proportional to the magnetic flux in the air-gap. And because the magnetic flux will be changed by the currents of the coils, the magnetic force can be controlled by changing the currents of the coils. That is, in the present invention, the magnetic force to the axial hybrid magnetic bearing is relative to the currents of the coils of the electric magnets, and has no relation to the distance.

Figure 3A:
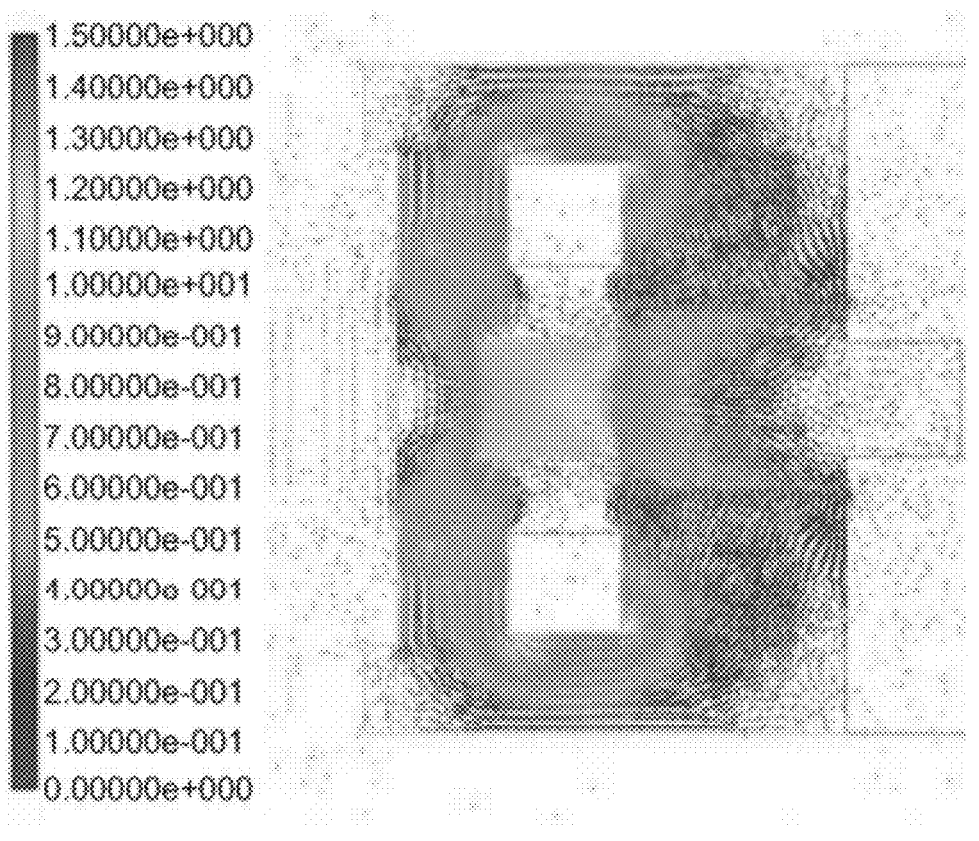
FIGS. 3A-3C illustrate the magnetic flux densities in airgaps for one preferred embodiment in accordance with the present invention when the coil current is changed from 0 A, 1 A, and 3 A.
Figure 3B:
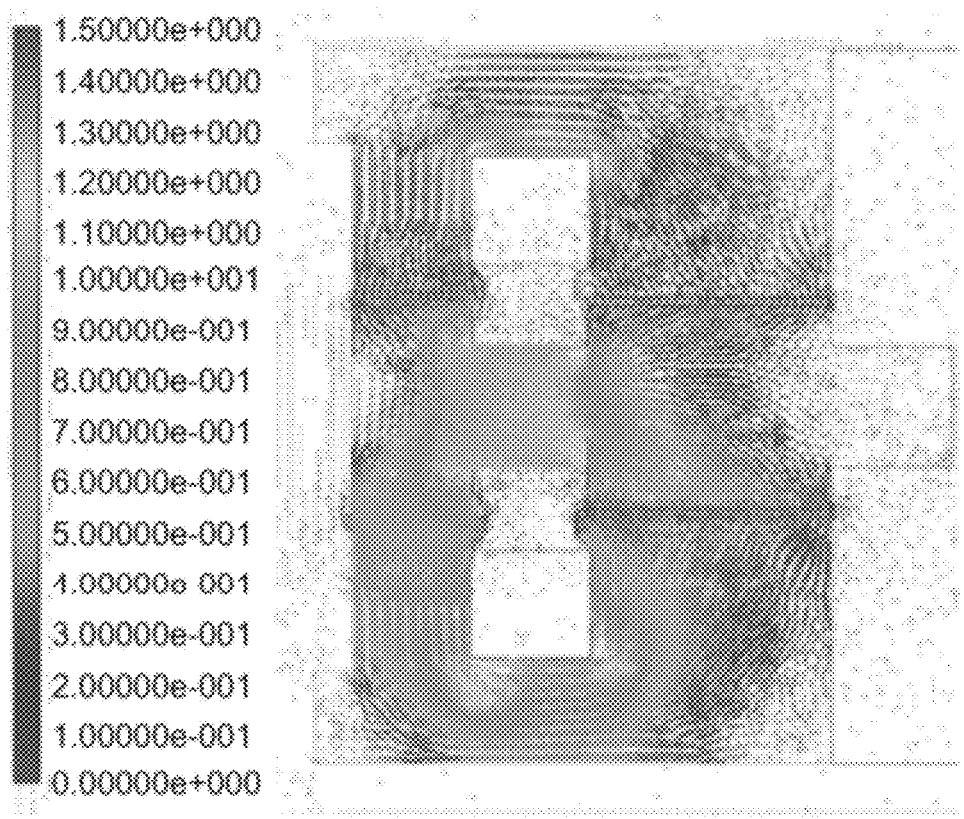
Figure 3C:
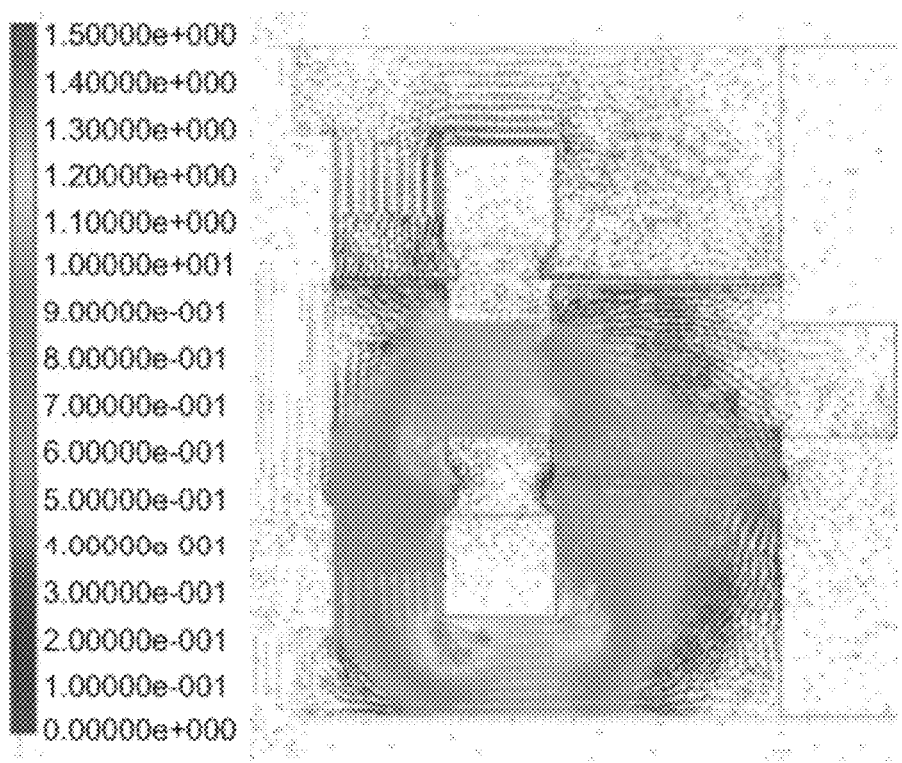

Referring to FIGS. 3A-3C, the magnetic flux densities in air-gaps for the preferred embodiment 100 shown in FIG. 1A in accordance with the present invention as the coil currents at 0 A, 1 A, and 3 A are illustrated. Simulations of the magnetic flux are analyzed by the finite element analysis software. The finite element method (FEM) model of the axial hybrid magnet bearing is built and the magnetic flux generated by the coils of the electric magnets will change the magnetic flux in the air-gaps. Please refer to FIG. 3A firstly. FIG. 3A only shows the magnetic flux density of the permanent magnet as the current of the coils is 0 A. Please refer to FIGS. 3B and 3C. When the currents of the coils are respectively changed to 1 A and 3 A, since the direction of the current in the coils is going clockwise, the magnetic flux of the up air-gap will be decreasing and the magnetic flux in the bottom air-gap will be increasing as shown in FIGS. 3B and 3C, respectively. Importantly, comparing the magnetic flux in the permanent magnet, there is no significant changes. That is, according to the simulation result, the magnetic flux of the rotor with the permanent magnet structure in accordance with the present invention is not changed by the coil current of the electric magnet. In other words, the magnetic flux in the air-gaps will be adjusted (decreasing or increasing) by controlling the direction of the current and the electric current intensity, and will not change the magnetic characteristic of the permanent magnet.

Figure 4:
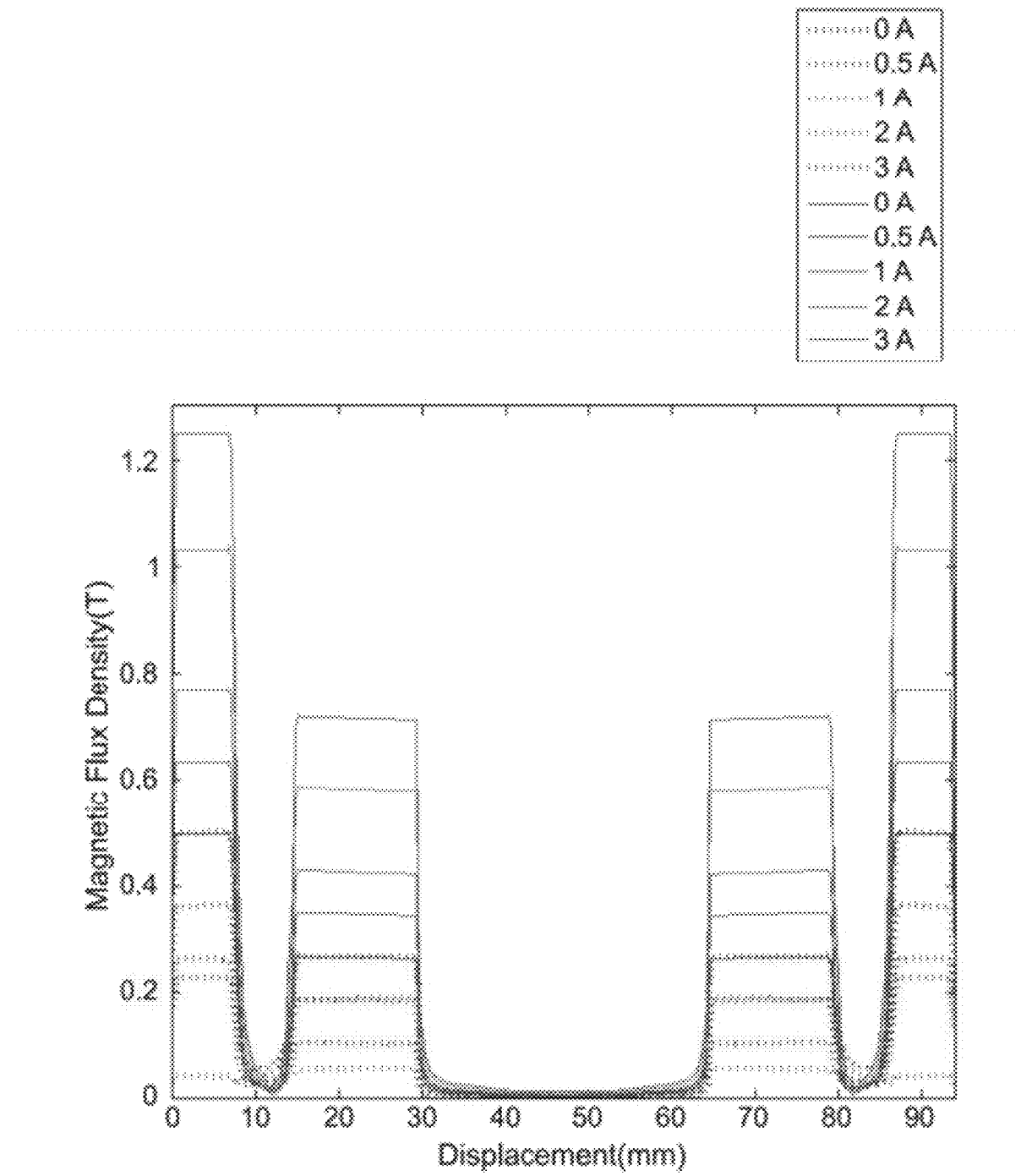
FIG. 4 illustrates the simulation results of the magnetic flux densities for one preferred embodiment in accordance with the present invention.

Referring to FIG. 4, the simulation results of the magnetic flux density for the preferred embodiment 100 shown in FIG. 1A in accordance with the present invention are illustrated. Since the FEM analysis model of the simulation is built with 2D coordinate, and the inside and the outside cross-sectional areas of the rotor are same, and the cross-sectional area of the 2D FEM analysis model is not uniform, the magnetic flux density is not separated uniformly. However, using the magnetic flux density measured from the analysis, the magnetic force can be calculated out as those shown in Table 1.

TABLE 1

The simulated axial magnetic force

| Displacement (mm) G = 0.3 mm | Current(A) | Out Force(N) | In Force(N) | Total Force(N) |
|---|---|---|---|---|
| | 0 A | 200.5051266 | 233.8430013 | −33.3379 |
| | 0.5 A | 324.929687 | 123.1009349 | 201.8287521 |
| | 1 A | 479.5200684 | 47.89651623 | 431.6235521 |
| | 2 A | 867.4100577 | 1.482778231 | 865.9272794 |

Figure 5A:
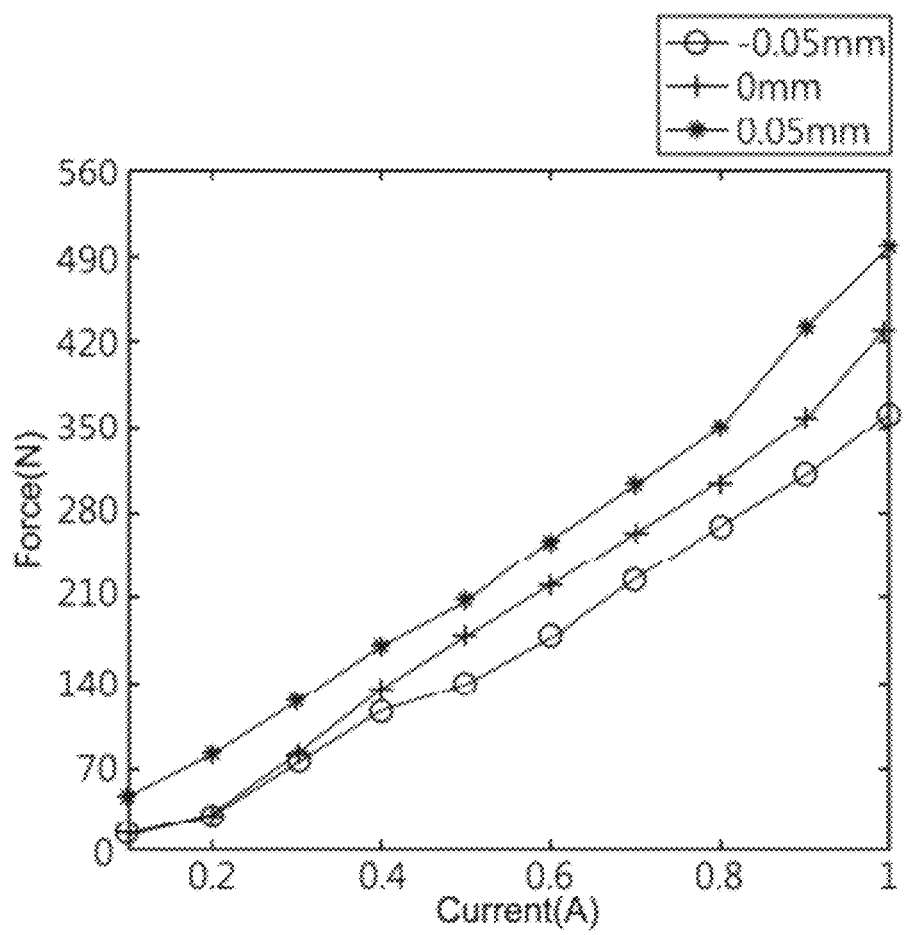
FIG. 5A illustrates the current-force relationship for one preferred embodiment in accordance with the present invention.
Figure 5B:
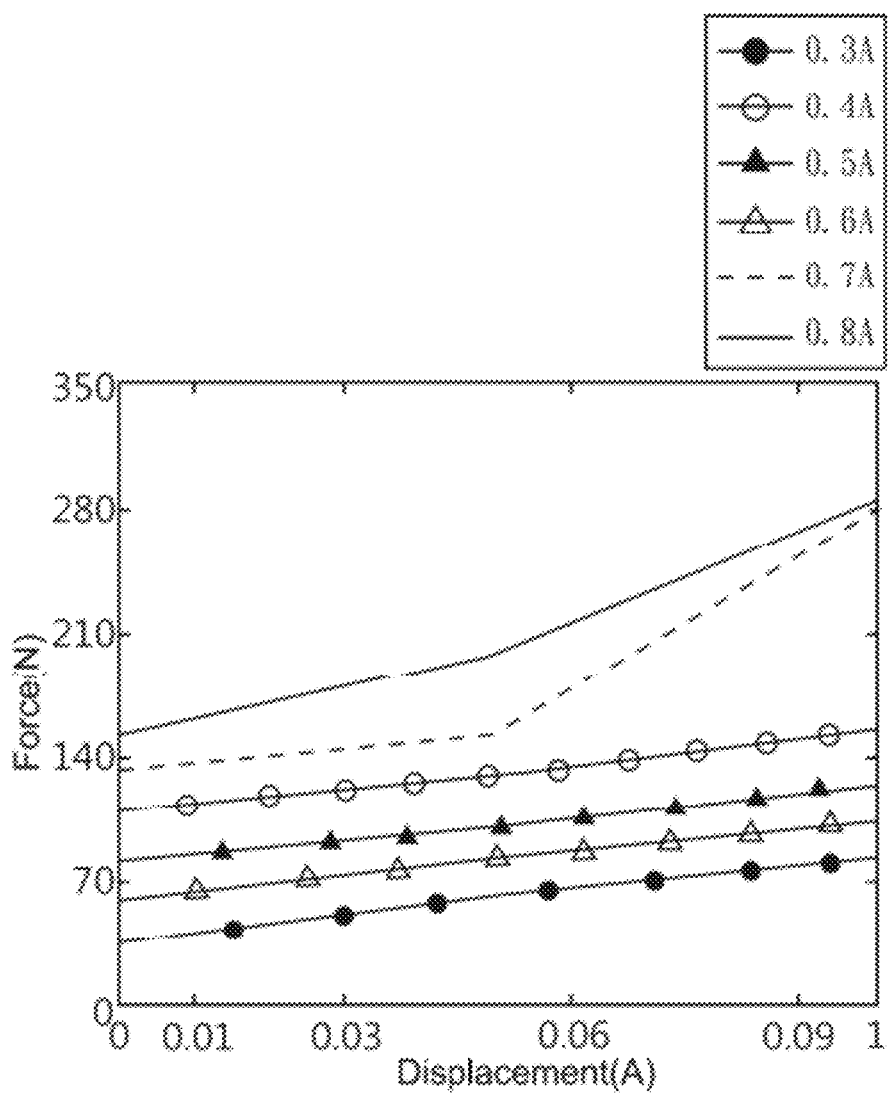
FIG. 5B illustrates the displacement-force relationship for one preferred embodiment in accordance with the present invention.

Referring to FIGS. 5A and 5B, the current-force relationship and the displacement-force relationship for the preferred embodiment 100 shown in FIG. 1A in accordance with the present invention are illustrated, respectively. In order to measure the characteristic of the axial hybrid magnetic bearing, the axial hybrid magnetic bearing is set on a CNC equipment. The force capacity is measured by the Load Cell. From the relation curve and data shown in FIG. 5A, the current-force coefficient $k_i$ is about 350 N/A. From the relation curve and data shown in FIG. 5B, the displacement-force coefficient $k_d$ is about 245000 N/m.

Importantly, the axial hybrid magnetic bearing disclosed by the present invention whose magnetic flux of the permanent magnet is not damaged by the coil currents of the electric magnets. Furthermore, according to the simulation results, the characteristic of the axial hybrid magnetic bearing is like the traditional active magnetic bearing but the power consumption is only about 0.24 W for lifting a 0.9 kg rotor. Hence, the present invention can lower the power consumption for magnetic bearings. Please refer to Table 2, it shows the parameters for one preferred embodiment in accordance with the present invention, but not limit to.

TABLE 2

Parameters of the axial hybrid magnetic bearing

Air-gap: 0.3 mm
Rotor diameter: 94 mm
Outside diameter of the stator: 94 mm
Thickness of the rotor disk: 0.9 mm
Outside diameter of the disk: 94 mm
Outside diameter of the permanent magnet: 79 mm
Inside diameter of the permanent magnet: 65 mm
Thickness of the permanent magnet: 7.5 mm Although specific embodiments have been illustrated and described, it will be obvious to those skilled in the art that various modifications may be made without departing from what is intended to be limited solely by the appended claims.

What is claimed is:

1. An axial hybrid magnetic bearing, comprising:
   a first electric magnet, wherein said first electric magnet is embedded in a first fixing part, wherein said first fixing part is a first disk-shaped stator with a cave in center, wherein said first electric magnet is arranged in a ring;
   a second electric magnet, wherein said second electric magnet is embedded in a second fixing part, wherein said second fixing part is a second disk-shaped stator with a cave in center, wherein said second electric magnet is arranged in a ring; and
   a rotor, wherein said rotor is a disk-shaped rotor with a rotation axis in center, wherein said rotor is between said first disk-shaped stator and said second disk-shaped stator, said rotor having a permanent magnet structure facing said first and said second electric magnets by its two sides, wherein said permanent magnet structure is arranged in a ring;

wherein said first electric magnet, said permanent magnet and said second electric magnet are respectively arrayed in a line along said rotation axis;

wherein a first magnetic flux provided by said permanent magnet structure passes through said rotor from inside to outside, taking two paths axially along the working air-gaps and passing through said working air-gaps between said rotor and said first fixing parts and said second fixing parts, passing through said first fixing parts and said second fixing parts from outside to inside, passing through said working air-gaps between said first fixing parts and said second fixing parts and said rotor, and then returns to said permanent magnet structure; and wherein said second magnetic flux provided by said first electric magnet and said second electric magnet passes through said first fixing part from outside to inside, axially along said working air-gaps and passing through said working air-gaps between said first fixing part and said rotor, passing said rotor, passing through said working air-gap between said rotor and said second fixing part, passing through said second fixing part from inside to outside, axially along said working air-gaps and passing through said working air-gaps between said second fixing part and said rotor, passing said rotor, passing through said working air-gap between said rotor and said first fixing part, and then returns to said first fixing part.

2. The axial hybrid magnetic bearing according to claim 1, wherein said first fixing part is a first stator, said second fixing part is a second stator.

3. The axial hybrid magnetic bearing according to claim 1, wherein said first electric magnet includes a first ring coil, said second electric magnet includes a second ring coil.

4. The axial hybrid magnetic bearing according to claim 1, wherein said rotor includes a disk-shaped structure.

5. The axial hybrid magnetic bearing according to claim 1, wherein said permanent magnet structure includes a plurality of arc-shaped permanent magnets.

6. The axial hybrid magnetic bearing according to claim 5, wherein said plurality of arc-shaped permanent magnets are arranged in concentric with said rotor.

7. The axial hybrid magnetic bearing according to claim 5, wherein said plurality of arc-shaped permanent magnets include 7 arc-shaped permanent magnets.

8. The axial hybrid magnetic bearing according to claim 1, wherein said permanent magnet structure provides a bias magnetic flux to lower the electric consumption of said axial hybrid magnetic bearing.

9. The axial hybrid magnetic bearing according to claim 1, wherein the magnetic fluxes generated by said first and said second electric magnets are used to adjust an equilibrium point of said rotor, and to couple with the magnetic flux of said permanent magnet structure, whereby the magnetic characteristic of said permanent magnet structure will not be changed.

10. A method for operating an axial hybrid magnetic bearing, said method comprising:

using a bias magnetic flux of a permanent magnet structure to suspend a rotor, wherein said permanent magnet structure is embedded in said rotor and faces a first electric magnet and a second electric magnet by its two sides, and wherein said first electric magnet and said second electric magnet are embedded in a first fixing part and a second fixing part, wherein said first fixing part and said second fixing part with a cave in center and said rotor are a first disk-shaped stator with a cave in center and a second disk-shaped stator with a cave in center and a disk-shaped rotor with a rotation axis in center, wherein said first electric magnet and said second electric magnet and said permanent magnet structure are arranged in a ring; and using the magnetic fluxes of said first electric magnet and said second electric magnet to adjust an equilibrium point of said rotor;

wherein said first electric magnet, said permanent magnet and said second electric magnet are respectively arrayed in a line along said rotation axis;

wherein a first magnetic flux provided by said permanent magnet structure passes through said rotor from inside to outside, taking two paths axially along said working air-gaps and passing through said working air-gaps between said rotor and said first fixing parts and said second fixing parts, passing through said first fixing parts and said second fixing parts from outside to inside, passing through said working air-gaps between said first fixing parts and said second fixing parts and said rotor, and then returns to said permanent magnet structure; and wherein said second magnetic flux provided by said first electric magnet and said second electric magnet passes through said first fixing part from outside to inside, axially along said working air-gaps and passing through said working air-gaps between said first fixing part and said rotor, passing said rotor, passing through said working air-gap between said rotor and said second fixing part, passing through said second fixing part from inside to outside, axially along said working air-gaps and passing through said working air-gaps between said second fixing part and said rotor, passing said rotor, passing through said working air-gap between said rotor and said first fixing part, and then returns to said first fixing part.

11. The method according to claim 10, wherein said rotor includes a disk-shaped structure.

12. The method according to claim 10, wherein said permanent magnet structure includes a plurality of arc-shaped permanent magnets.

13. The method according to claim 12, wherein said plurality of arc-shaped permanent magnets are arranged in concentric with said rotor.

14. The method according to claim 12, wherein said plurality of arc-shaped permanent magnets include 7 arc-shaped permanent magnets.

15. The method according to claim 10, wherein said first electric magnet is embedded in a first fixing part, said second electric magnet is embedded in a second fixing part.

16. The method according to claim 15, wherein said first fixing part is a first stator, said second fixing part is a second stator.

17. The method according to claim 10, wherein said first electric magnet includes a first ring coil, said second electric magnet includes a second ring coil.

18. The method according to claim 10, wherein said first and said second electric magnets are controlled by a proportional and derivative controller.

19. The method according to claim 10, wherein said permanent magnet structure provides a bias magnetic flux to lower the electric consumption of said axial hybrid magnetic bearing.

20. The method according to claim 10, wherein the magnetic fluxes generated by said first and said second electric magnets are used to couple with the magnetic flux of said permanent magnet structure, whereby the magnetic characteristic of said permanent magnet structure will not be changed.

* * * * *